UNITED STATES PATENT OFFICE.

CHARLES THELISMOR SNEDEKOR, OF WORCESTER, MASSACHUSETTS.

ART OF PAINTING SURFACES.

SPECIFICATION forming part of Letters Patent No. 512,523, dated January 9, 1894.

Application filed March 18, 1893. Serial No. 466,709. (No specimens.)

*To all whom it may concern:*

Be it known that I, CHARLES THELISMOR SNEDEKOR, a citizen of the United States, residing at Worcester, in the county of Worcester and Commonwealth of Massachusetts, have invented a new and useful Improvement in the Art of Painting Surfaces, of which the following is a specification.

My invention consists in applying dry pigments in a new way, to any flat surfaces, such as wood, tin, iron, glass, or leather.

In using my improved process, I first treat the surface with a substratum composed of silicate and an alkaline solution of shellac, as follows:—saturated solution of carbonate of soda, eight and one-half ounces; bleached gum shellac, one ounce; silicate of soda, one-half ounce. After this is applied and thoroughly dried, an application is made of an emulsion consisting of three parts of carbonate of ammonia, four parts of chromic acid, one part of caramel, one part of agar-agar, and eight parts of distilled water, which should be filtered before it is applied. The article thus covered with the solution is preferably put in a closed receptacle until sufficiently desiccated; where a solid color is desired, the article thus coated is rubbed over with any desired pigment, which should be perfectly dry and in powdered form, and may be conveniently applied with brush or blow-pipe. Any desired ornamental effect may also be permanently produced upon this surface thus prepared, by the use of a stencil. As soon as the emulsion is applied, the stencil, or its equivalent is placed upon the prepared surface, and the article to receive the impression is then exposed to the action of steam for sixty seconds, more or less, in a closed compartment. The stencil is then removed and the pigment applied, whereupon the design of the stencil is reproduced upon the prepared surface. It will be seen that there is no limit to the variety or kind of impressions which may thus be produced upon the prepared surface. If it is desired to make an impression on plain glass, the glass can be backed with a coating of black or colored varnish, and the result will be most effective. After the process has been completed, as above described, the article treated may receive a coating of transparent varnish, which makes an excellent finish.

Having thus described my invention, what I claim as new, and desire to secure by Letters Patent, is—

In the art of producing impressions upon surfaces; a substratum or filling of silicate and alkaline solution of shellac, covered by an emulsion consisting of three parts carbonate of ammonia, four parts chromic acid, one part caramel, one part agar-agar, eight parts filtered water, as a bedding for pigments, the surface thus treated being covered with a coating of varnish.

CHARLES THELISMOR SNEDEKOR.

Witnesses:
C. G. WASHBURN,
R. M. WASHBURN.